United States Patent [19]

Smith

[11] 4,286,430
[45] Sep. 1, 1981

[54] GAS TURBINE ENGINE

[75] Inventor: Raymond Smith, Monclova, Ohio

[73] Assignee: Teledyne Industries, Inc., Los Angeles, Calif.

[21] Appl. No.: 76,391

[22] Filed: Sep. 17, 1979

[51] Int. Cl.$^3$ .............................................. F02C 3/10
[52] U.S. Cl. .............................. 60/39.16 R; 60/226 R
[58] Field of Search ................... 60/39.16 R, 39.16 C, 60/39.16 S, 226 R

[56] References Cited

U.S. PATENT DOCUMENTS

| 2,625,012 | 1/1953 | Larrecq | 60/39.16 R |
| 3,524,318 | 8/1970 | Bauger et al. | 60/39.16 R |
| 3,729,957 | 5/1973 | Petrio et al. | 60/39.16 C |

FOREIGN PATENT DOCUMENTS

| 980416 | 5/1951 | France | 60/39.16 R |

Primary Examiner—Louis J. Casaregola
Attorney, Agent, or Firm—Gifford, Van Ophem, Sheridan & Sprinkle

[57] ABSTRACT

A gas turbine engine is provided and comprises a housing having an air inlet and an exhaust outlet with a fluid passageway formed through the housing for connecting the inlet to the outlet. A low pressure spool assembly comprises a first shaft rotatably mounted within the housing and has at least one low pressure compressor stage secured to one end of the first shaft and a low pressure turbine stage secured to the other end of the first shaft. The low pressure compressor stage is disposed within the fluid passageway immediately downstream from the housing inlet while, conversely, the low pressure turbine stage is disposed within the fluid passageway and immediately upstream from the outlet. An intermediate pressure spool assembly is also provided and comprises a second shaft rotatably mounted within the housing and coaxial with the first shaft, an intermediate pressure compressor stage secured to one end of the second shaft and an intermediate pressure turbine stage secured to the other end of the second shaft. The intermediate pressure compressor stage is disposed within the fluid passageway immediately downstream from the low pressure compressor stage while the intermediate pressure turbine stage is positioned immediately upstream from the low pressure turbine stage. A high pressure spool assembly is further provided and comprises a third shaft rotatably mounted within the housing and having a high pressure compressor stage secured to one end of the shaft and a high pressure turbine stage secured to the other end of the third shaft. The high pressure compressor stage is disposed within the fluid passageway immediately downstream from the intermediate pressure compressor stage while the high pressure turbine stage is disposed immediately upstream from the intermediate pressure turbine stage. The high pressure stage further includes a fuel combustor and, in addition, the axis of the third or high pressure shaft is offset from and preferably perpendicular to the axes of the first and second shafts.

9 Claims, 4 Drawing Figures

GAS TURBINE ENGINE

BACKGROUND OF THE INVENTION

I. Field of the Invention

The present invention relates generally to gas turbine engines and, more particularly, to a triple spool gas turbine engine.

II. Description of the Prior Art

There have been a number of previously known gas turbine engines. Many of these previously known gas turbine engines comprise a housing having an air inlet, an exhaust outlet and a fluid passageway for connecting the inlet to the outlet. A main shaft is rotatably mounted within the housing and has an air compressor means secured to the shaft at one end and a turbine expander means secured to the shaft at its opposite end. A combustor is operatively positioned within the fluid passageway between the compressor and turbine means.

The compressor means for many of these previously known gas turbine engines typically comprises an axial compressor in which the intake air is increasingly compressed prior to its introduction to the combustor. Similarly, the turbine expander means typically comprises a plurality of turbine wheels or stages which progressively increase in size and through which the combustion products or gas stream from the combustor expand to both rotatably drive the compressor and also to provide the thrust for the turbine engine.

For maximum turbine engine efficiency, and hence for minimum fuel consumption, it is necessary to minimize the internal losses of the engine. Such internal losses result, for example, from gas leakage flow from the high pressure regions of the turbine engine and particularly around the turbine shaft. Such internal losses are particularly disadvantageous for relatively small turbine engines, i.e. turbine engines producing generally less than 10,000 pounds of thrust, since engine efficiency increases with engine size.

Another disadvantage of these previously known gas turbine engines is that the low pressure turbine stages are used to drive the intermediate compressor stages. Since the turbine blade stresses are proportional to the product of the turbine blade annulus area and the speed squared, the low pressure turbine must be designed to withstand the stress levels produced from driving the intermediate compressor stages. Moreover, compromises in the turbine and/or compressor stages are often necessary to enable the various compressor and turbine stages to operate within the acceptable stress levels and such design compromises inherently adversely effect engine efficiency.

SUMMARY OF THE PRESENT INVENTION

The present invention overcomes the above mentioned disadvantages of the previously known gas turbine engines by providing a triple spool high efficiency gas turbine engine and which is particularly advantageous for use as a small, i.e. generally less than 10,000 pounds thrust, turbine engine.

In brief, the gas turbine engine according to the present invention comprises a support housing having an air intake and an exhaust gas outlet. A fluid passageway fluidly connects the air intake with the exhaust outlet. The gas turbine engine further includes a low pressure spool assembly having a first shaft rotatably mounted within the support housing. At least one low pressure compressor stage is secured at one end of the first shaft so that the compressor stage is operatively positioned within the fluid passageway immediately downstream from the air intake. In addition, at least one low pressure turbine stage is secured to the other end of the first shaft and positioned within the fluid passageway immediately upstream from the exhaust outlet.

The turbine engine further includes an intermediate pressure spool assembly having a second shaft rotatably mounted within the housing coaxially with the first shaft. At least one intermediate pressure compressor stage is secured to one end of the second shaft and operatively positioned within the fluid passageway immediately downstream from the low pressure compressor stage. At least one intermediate pressure turbine stage is likewise secured to the other end of the second shaft and operatively disposed within the fluid passageway immediately upstream from the low pressure turbine stage. In the preferred form of the invention, the second shaft is tubular and the first shaft extends coaxially through the second shaft.

The turbine engine further includes a high pressure spool assembly having a third shaft rotatably mounted within the main support housing. At least one high pressure compressor stage is secured to one end of the third shaft and operatively positioned within the fluid passageway immediately downstream from the intermediate pressure compressor stage. Similarly, a high pressure turbine stage is secured to the other end of the third shaft and positioned within the fluid passageway immediately upstream from the intermediate pressure turbine stage. A combustor is contained within the high pressure spool assembly between its turbine and compressor stages for combusting the engine fuel.

Unlike the first and second shaft, however, the third shaft for the high pressure spool assembly is offset from and preferably perpendicular to the first and second shafts. An intake scroll tube ducts the compressed air from the intermediate spool compressor to the high pressure spool assembly while, similarly, an exhaust scroll tube ducts the exhaust from the high pressure turbine assembly and to the intermediate pressure turbine assembly. Moreover, the off axis mounting of the third shaft eliminates the necessity of providing a through hole for the shaft in the high pressure region of the gas turbine engine and likewise reduces the previously known leakage around the turbine shaft in the high pressure engine zones.

The off axis mounting of the high pressure spool assembly is also further advantageous in that it provides great flexibility in locating the high pressure spool assembly relative to the low and intermediate pressure spool assemblies. This flexibility in locating the high pressure spool assembly also enables the reduction in the overall length of the gas turbine engine.

The gas turbine engine of the present invention is further advantageous in that a one-to-one match between each compressor and its turbine stage is obtained since each turbine stage drives only its associated compressor stage. This construction further enables the highest turbine blade annulus area to be matched with the lowest speed and thus minimizes the stress level in each turbine stage.

BRIEF DESCRIPTION OF THE DRAWING

A better understanding of the present invention will be had upon reference to the following detailed description when read in conjunction with the accompanying drawing wherein like references characters refer to like parts throughout the several views, and in which.

DETAILED DESCRIPTION OF THE PRESENT INVENTION

Figure 1:
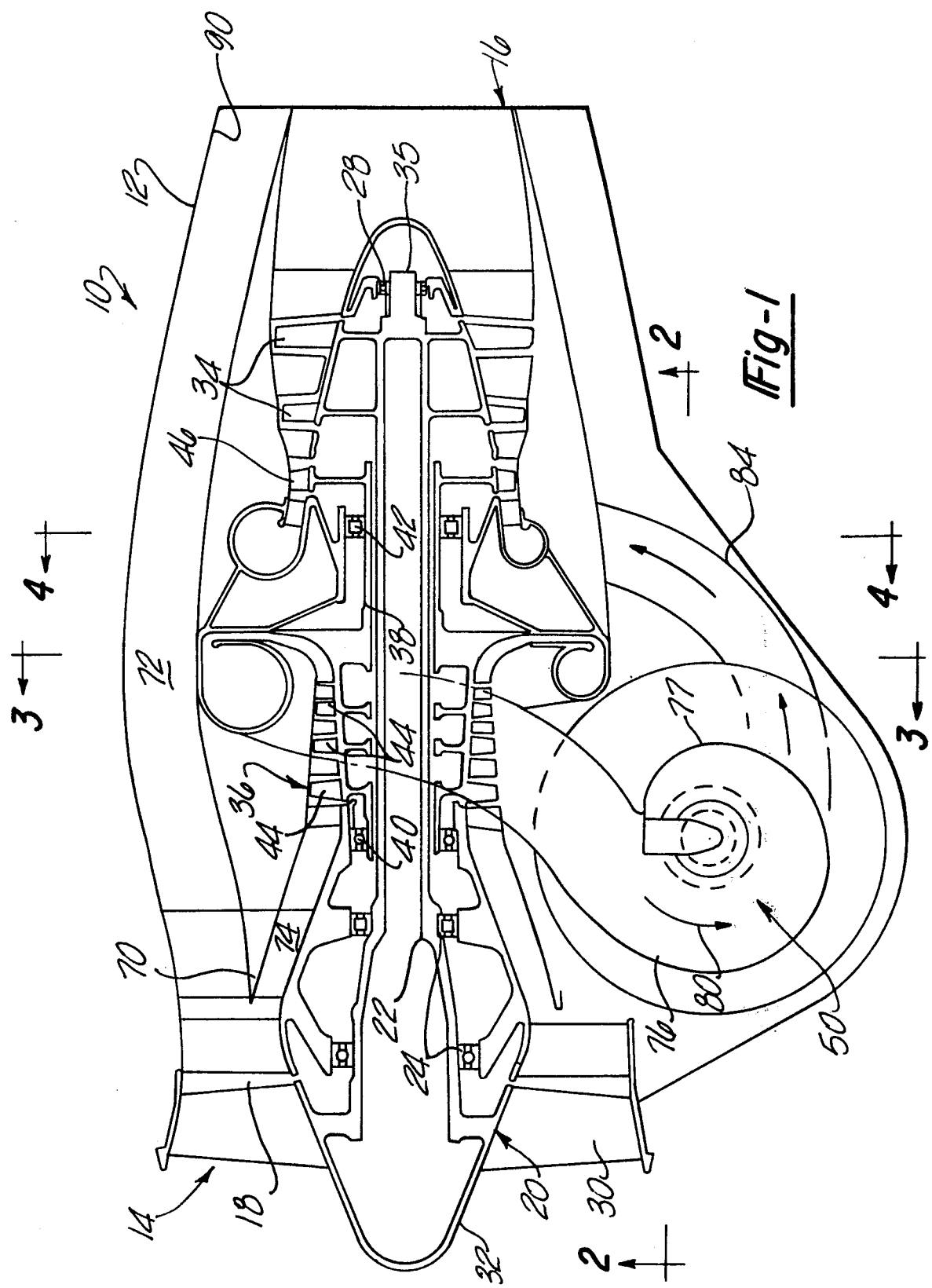
FIG. 1 is a longitudinal sectional view illustrating the turbine engine according to the present invention.

With reference first to FIG. 1, the gas turbine engine 10 according to the present invention is thereshown and comprises a support housing 12 having an air intake 14 and an exhaust gas outlet 16. A fluid passageway 18, which will be subsequently described in greater detail, connects the air intake 14 with the exhaust gas outlet 16.

A low pressure spool assembly 20 is contained within the housing and includes an elongated tubular shaft 22 which extends longitudinally through the support housing 12. The shaft 22 is rotatably mounted to the support housing 12 by front bearings 24 and by rear bearings 28. At least one low pressure compressor stage 30, i.e. a compressor fan, is secured to the front end 32 of the shaft 22 so that the low pressure compressor stage 30 is positioned within the fluid passageway 18 and immediately downstream from the air intake 14. In addition, at least one and preferably two low pressure turbine stages 34 are secured adjacent to the opposite or rear end 35 of the shaft 22 and immediately upstream from the exhaust outlet 16.

Still referring to FIG. 1, the turbine engine 10 further comprises an intermediate pressure spool assembly 36 which is contained within the support housing 12. The intermediate pressure spool assembly 36 further includes a tubular shaft 38 which is rotatably mounted to the housing 12 by bearings 40 and 42 so that the shaft 38 is coaxially positioned around the first shaft 22. One or more intermediate pressure compressor stages, 44 are secured to the shaft 38 adjacent its forward end immediately downstream from the low forward pressure compressor stage 30. Similarly, at least one intermediate pressure turbine stage 46 is secured to the opposite end of the shaft 38 immediately upstream from the low pressure turbine stages 34.

Figure 2:
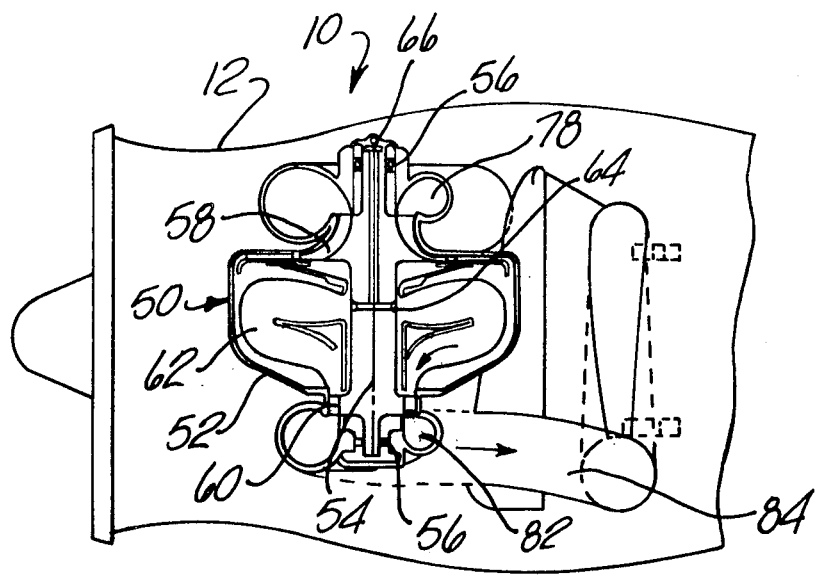
FIG. 2 is a sectional view taken substantially along line 2—2 in FIG. 1.

With reference now particularly to FIG. 2, the turbine engine 10 further includes a high pressure spool assembly 50 contained within a housing part 52 which itself is contained within the main support housing 12. The high pressure spool assembly 50 includes a third shaft 54 rotatably mounted to the housing part 52 by bearings 56. A high pressure compressor stage 58 is secured to the shaft 54 adjacent its inlet 78 end while, similarly, a high pressure turbine stage 60 is secured to the shaft 54 adjacent its other or outlet 82 end.

The high pressure spool assembly 50 further includes a combustor assembly 62 which receives the air from the high pressure compressor stage 58 and into which fuel is injected and combusted prior to expansion through the high pressure turbine stage 60. Preferably fuel is injected into the combustor assembly 62 by means of a fuel slinger 64 integrally formed with the shaft 54. Fuel is supplied to the slinger 64 by a fuel pump (not shown) through an opening 66 in the shaft 54. Moreover, each axial end of the housing part 52 is preferably closed and the shaft 54 is wholly contained within the housing part 52.

The third or high pressure shaft 54 is offset from and preferably perpendicularly aligned with the first and second shafts 22 and 38, respectively. As is best shown in FIG. 1, the high pressure spool assembly 50 is preferably positioned below the intermediate pressure spool assembly 36.

With reference now to FIG. 1, the fluid passageway 18 formed through the support housing 10 is divided by static structure 70 (FIG. 1) immediately downstream from the low pressure compressor stage 30 into an outer flow channel 72 and an inner flow channel 74. The intermediate pressure compressor stages 44 are all operatively positioned within the inner flow channel 74.

Figure 3:
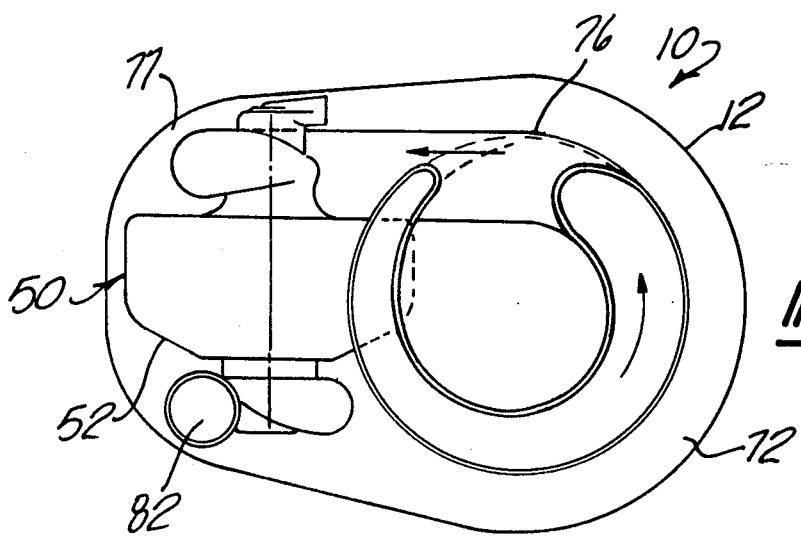
FIG. 3 is a sectional view taken substantially along line 3—3 in FIG. 1.

With reference now particularly to FIGS. 1-3, the compressed air output from the final stage of the intermediate compressor stages 44 is connected by an inlet scroll tube 76 to inlet 78 to the high pressure compressor stage 58. The scroll tube 76 is circular in cross section thus reducing the surface friction between the scroll tube 76 and the compressed air flowing through it. In addition, the cross-sectional area of the scroll tube 76 is gradually varied from the outlet from the intermediate compressor stage and to the inlet 78 to the high pressure compressor stage thus providing careful controlled flow of the compressed air. As is best shown in FIGS. 2 and 3, the scroll tube 76 is circumferentially wrapped around the high pressure compressor stage 58 as shown at 77 so that the air injected into the high pressure spool assembly 50 contains a circumferential velocity component in the same direction of rotation of the third shaft 54 as indicated by arrow 80 (FIG. 1). Fuel from the slinger 64 is burned within the combustor assembly 62 in the conventional fashion.

Figure 4:
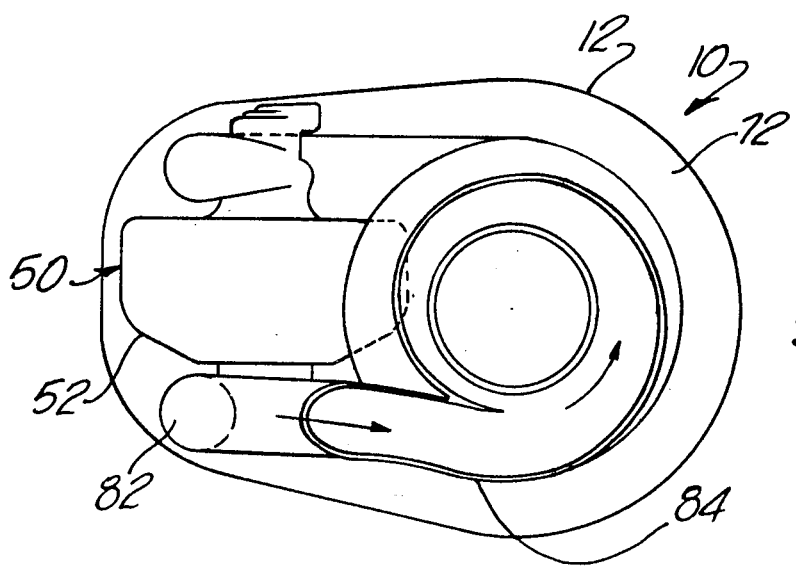
FIG. 4 is a sectional view taken substantially along line 4—4 in FIG. 1.

With reference now particularly to FIGS. 1, 2 and 4, the outlet 82 from the high pressure spool assembly 50 is similarly connected by an outlet scroll tube 84 to the first of the intermediate pressure turbine stages 46. Like the inlet scroll tube 76, the outlet scroll tube 84 extends at least partially circumferentialy around the intermediate pressure turbine stage 46 so that the air exhausting from the outlet scroll tube 84 has a circumferential velocity component in the same direction of rotation as the intermediate shaft 38 in order to maximize engine efficiency. The outlet scroll tube 84 is also circular in cross section to minimize friction between the tube 84 and the gases flowing through it.

After passing through the second scroll 84, the exhaust gases from the high pressure spool assembly 50 exhaust through the intermediate and low pressure turbine stages 46 and 34, respectively, and are ultimately exhausted through the exhaust outlet 16 from the housing 12. The exhaustion of the combustion products through the high pressure turbine stage 60, the intermediate pressure turbine stage 46 and the low pressure turbine stage 34, of course, respectively rotatably drives the high, intermediate and low pressure turbine shafts. In addition, it should be noted that the high pressure turbine stage 60 rotatably drives only the high pressure stage compressor 58 and the same is also true for the intermediate and low pressure turbine stages.

Referring now primarily to FIG. 1, the outer flow channel 72 extends from the low pressure compressor stage 30 through the housing 12 and is exhausted through an annular output 90 formed concentrically around the exhaust outlet 16. The compressed air flow through the outer flow channel 72 augments the overall thrust output from the engine 10 as the compressed gases are exhausted through the annular passageway 90. In addition, the housing part 52 for the high pressure spool assembly 50 is disposed within a part of the outer flow channel 72 so that any heat losses from the high pressure spool assembly 50 are recovered and transferred to the air flow through the outer flow channel 72 to thereby increase the overall thrust from the turbine engine 10.

The actual position or orientation of the high pressure spool assembly 50 is not critical to practice the present invention although the offset and perpendicular arrangement shown in the drawing is preferred. For example, the third spool assembly 50 could alternatively be arranged parallel to but offset from the axis of rotation of the first shaft 22 and second shaft 38. Alternatively, the axis of rotation for the high pressure turbine shaft 54 could be arranged so that it obliquely or even perpendicularly intersects the axis of rotation of the low pressure and intermediate pressure turbine shafts. In this event, however, the exhaust scroll tube 84 would be replaced by an axial discharge tube from the high pressure turbine 60 and to the intermediate pressure turbine 46.

From the foregoing, it can be seen that the gas turbine engine 10 according to the present invention provides a unique and highly efficient turbine engine and one which is particularly suited for use as a relatively small turbine engine, i. e. a turbine engine having generally less than 10,000 pounds of thrust. In particular, the triple spool arrangement with the third or high pressure spool offset from the low and intermediate pressure spools permits great flexibility in configuring the overall gas turbine engine 10 and, in particular, enables an overall reduction of the longitudinal length of the gas turbine engine.

A still further advantage of the turbine engine 10 according to the present invention is that the third or high pressure turbine shaft is wholly contained within its housing part 52 and eliminates the necessity of through bores through the housing part 52 for the turbine shaft. By closing each axial end of the housing part 52, the leakage of compressed air or combustion products around the high pressure turbine shaft is greatly reduced. This reduction of leakage likewise increases the overall efficiency of the turbine engine and decreases fuel consumption.

A still further advantage of the gas turbine engine 10 according to the present invention is the use of the two scroll tubes 76 and 84 for fluidly connecting the high pressure spool 50 with the intermediate pressure spool 36. The scroll tubes 76 and 84 in particular take advantage of the scroll or circumferential velocity component of the compressed air exiting from the intermediate pressure compressor stage 44, or, alternatively, the combustion product output from the high pressure turbine stage 60, and thus, minimizes undesirable turbulence of the gas stream in the engine.

A still further important feature of the turbine engine 10 of the present invention is that each turbine stage is matched with and rotatably drives only its associated compressor stage. For example, the high pressure turbine stage 60 rotatably drives only the high pressure compressor stage 58. Likewise, the intermediate pressure turbine stage 46 rotatably drives only its intermediate pressure compressor 44 and the low pressure turbine stage 34 drives only its compressor 30. The matched relationship between the turbine and compressor stages enables the highest turbine blade annulus area to be used with the lowest speed and thus minimizes stress levels without compromise of design criteria of the various turbine and compressor stages.

Having described my invention, however, many modifications thereto will become apparent to those skilled in the art to which it pertains without deviation from the spirit of the invention as defined by the scope of the appended claims.

I claim:

1. A gas turbine engine comprising:
   a housing having an air inlet and an exhaust outlet;
   fluid passage means formed through said housing between said inlet and said outlet;
   a low pressure spool assembly comprising a first shaft rotatably mounted in the housing, at least one low pressure compressor stage disposed in said fluid passage means and secured adjacent one end of said first shaft, and at least one low pressure turbine stage disposed in said fluid passage means and secured adjacent the other end of the shaft;
   an intermediate pressure spool assembly comprising a second shaft rotatably mounted in said housing, at least one intermediate pressure compressor stage disposed in said fluid passage means immediately downstream from said low pressure compressor stage and secured adjacent one end of said second shaft, at least one intermediate pressure turbine stage disposed in said fluid passageway upstream from said low pressure turbine stage and secured to said second shaft adjacent its other end;
   a high pressure spool assembly comprising a third shaft rotatably mounted in said housing, at least one high pressure compressor stage disposed in said fluid passage means downstream from said intermediate pressure compressor stage and secured adjacent one end of said third shaft, at least one high pressure turbine stage disposed in said fluid passage means upstream from said intermediate pressure turbine stage and secured to said third shaft adjacent its other end;
   combustor means for burning a fuel between said high pressure compressor and turbine stages;
   wherein said first and second shafts are coaxial with each other; and
   wherein the axis of said third shaft is substantially perpendicular and radially offset with respect to the axis of said first or second shaft so that said high pressure spool assembly straddles the low and intermediate pressure spool assemblies.

2. The invention as defined in claim 1 wherein said fluid passage means further comprises an inner flow channel and an outer flow channel, said intermediate pressure and high pressure spool assemblies being operatively disposed in said inner flow channel and said outer flow channel extending directly from said low pressure compressor and to said outlet and further comprising a housing part in which said high pressure spool assembly is contained, said housing part being positioned at least in part in said outer flow channel so that at least a portion of any heat loss from said housing part enters the air flow through the outer flow channel and augments the thrust from the outlet.

3. The invention as defined in claim 1 wherein said second shaft is tubular and wherein said first shaft extends coaxially entirely through said second shaft.

4. The invention as defined in claim 1 wherein said third shaft is wholly contained within said housing part, said housing part being completely closed at each axial end of the third shaft thereby eliminating any leakage axially from the housing part.

5. The invention as defined in claim 4 wherein an arcuate scroll tube fluidly connects said intermediate pressure compressor stage with said high pressure compressor stage.

6. The invention as defined in claim 5 wherein a second arcuate scroll tube fluidly connects said high pressure turbine stage with said intermediate turbine stage.

7. The invention as defined in claim 5 wherein said scroll tube is substantially circular in cross-sectional shape.

8. The invention as defined in claim 7 wherein the cross-sectional area of the scroll tube gradually varies from said intermediate pressure compressor stage to said high pressure compressor stage.

9. The invention as defined in claim 1 and further comprising a first arcuate scroll tube fluidly connecting said intermediate pressure compressor stage with said high pressure compressor stage and a second arcuate scroll tube fluidly connecting said high pressure turbine stage with said intermediate turbine stage and wherein said scroll tubes are substantially the same in lineal length.

* * * * *

UNITED STATES PATENT AND TRADEMARK OFFICE
CERTIFICATE OF CORRECTION

PATENT NO. : 4,286,430
DATED : September 1, 1981
INVENTOR(S) : Raymond Smith

It is certified that error appears in the above-identified patent and that said Letters Patent are hereby corrected as shown below:

Column 4, line 19, after "76", insert --(FIG. 3)--.

Signed and Sealed this

Twenty-second Day of December 1981

|SEAL|

Attest:

GERALD J. MOSSINGHOFF

Attesting Officer        Commissioner of Patents and Trademarks